No. 820,477. PATENTED MAY 15, 1906.
J. H. CROSKEY.
APPARATUS FOR MANUFACTURING GLASS ARTICLES.
APPLICATION FILED JUNE 10, 1904. RENEWED OCT. 10, 1905.
3 SHEETS—SHEET 1.
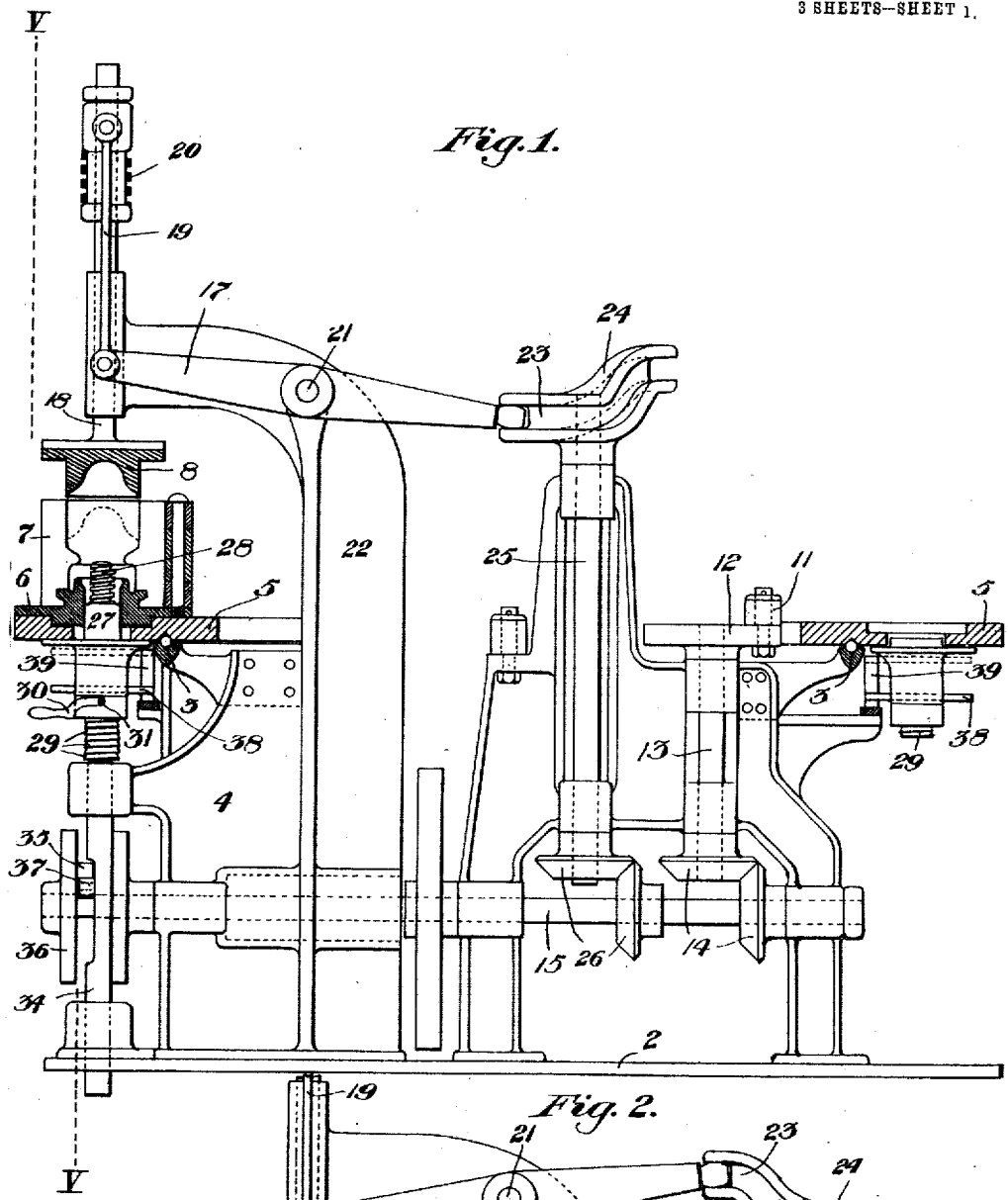

No. 820,477. PATENTED MAY 15, 1906.
J. H. CROSKEY.
APPARATUS FOR MANUFACTURING GLASS ARTICLES.
APPLICATION FILED JUNE 10, 1904. RENEWED OCT. 10, 1905.
3 SHEETS—SHEET 3.
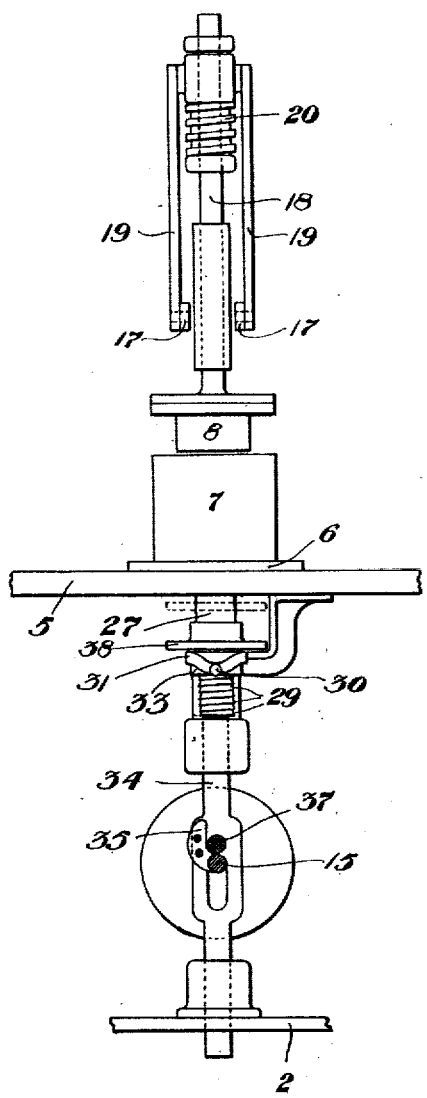
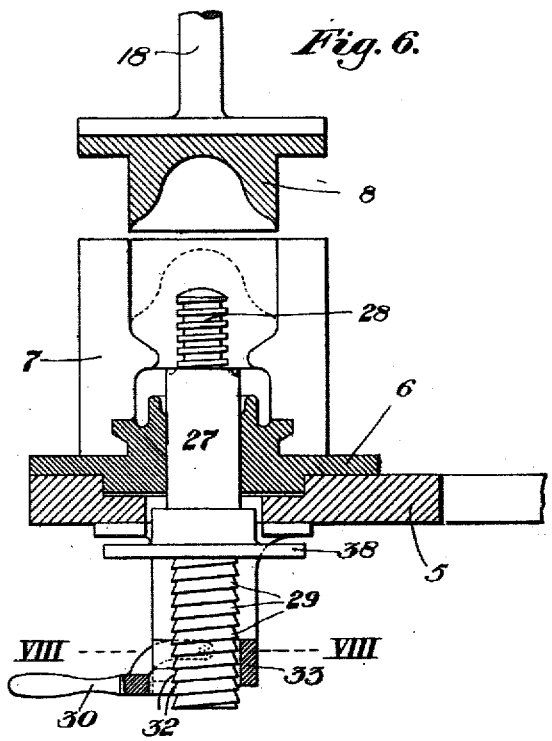
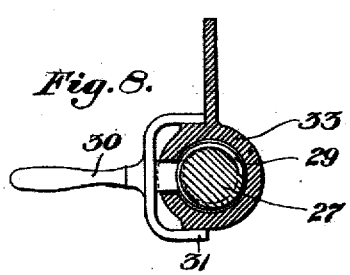

UNITED STATES PATENT OFFICE.

JOHN H. CROSKEY, OF PITTSBURG, PENNSYLVANIA, ASSIGNOR TO DUQUESNE GLASS COMPANY, OF PITTSBURG, PENNSYLVANIA, A CORPORATION OF PENNSYLVANIA.

APPARATUS FOR MANUFACTURING GLASS ARTICLES.

No. 820,477.　　　　Specification of Letters Patent.　　　Patented May 15, 1906.

Application filed June 10, 1904. Renewed October 10, 1905. Serial No. 282,166.

*To all whom it may concern:*

Be it known that I, JOHN H. CROSKEY, a citizen of the United States, residing at Pittsburg, in the county of Allegheny and State of Pennsylvania, have invented certain new and useful Improvements in Apparatus for Manufacturing Glass Articles, of which the following is a specification, reference being had therein to the accompanying drawings, forming part of this specification, in which—

Figure 3:
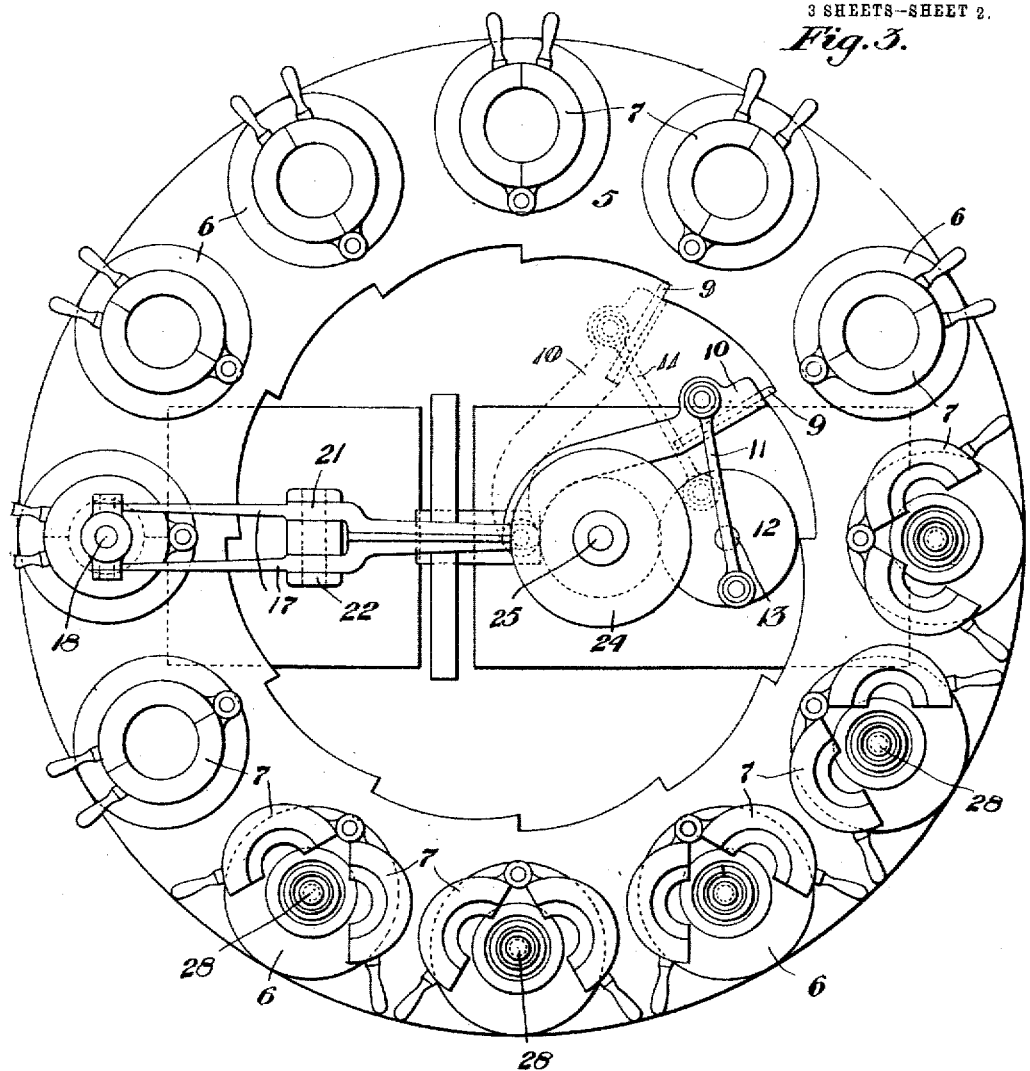
Figure 4:
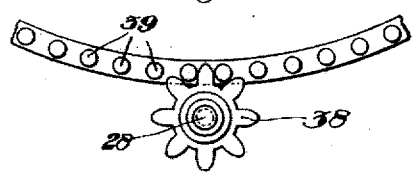

Figure 1 is a view in vertical sectional elevation of my improved molding apparatus for plastic material. Fig. 2 is a partial similar view showing the upper-mold plunger depressed. Fig. 3 is a plan view of the rotating table, illustrating the molds and the different steps of the operation. Fig. 4 is a detail view of one of the screw-spindles rotating wheels in engagement with the stationary pins. Fig. 5 is a vertical sectional view indicated by the line V V of Fig. 1. Fig. 6 is a vertical sectional detail view of one of the molds and the ratchet-controlled plunger for forming the threaded socket. Fig. 7 is a sectional detail view of the ratchet detached. Fig. 8 is a horizontal sectional view on the line VIII VIII of Fig. 6.

My invention refers to improvements in apparatus for forming articles of a plastic nature, as glass, and is particularly designed for the manufacture of insulators for telegraph or other wires.

The invention has in view the rapid economical manufacture of such devices of uniform character by means of mechanism adapted to press the article in suitable molds, together with a vertically-reciprocating threaded plunger adapted to be raised into suitable position and held there during pressing operation and to be removed by unscrewing after the article is formed, so as to leave a threaded interior cavity and allow the finished insulator to be removed from the mold.

Referring now to the drawings illustrating the invention, 2 represents any suitable base upon which the structure and operative elements comprising my invention are mounted. 3 is a ball-race mounted upon the structural framework 4, provided with an annular groove adapted to support a series of bearing-balls, as shown, upon which balls rests a turn-table 5, adapted to support and carry the molds. These molds are of the usual well-known construction, comprising a base-mold 6, upon which are mounted the hinged sides of divided molds 7, as will be readily understood, and these molds are adapted to be intermittently rotated around upon the carrier 5, so as to bring each mold beneath a pressing-plunger 8 at the proper place and time. The table 5 is intermittently actuated by means of a spring-controlled pawl or latch 9, mounted in the outer end of a swinging arm 10, actuated by pitman 11 from crank-disk 12 on the upper end of shaft 13, driven by gearing 14 from main shaft 15. The operation of this construction will be readily understood from Figs. 1 and 3, and the turn-table is rotated thereby between each period of rest occurring during back travel of the pawl 9. The plunger 8 is also reciprocated and pressed downwardly into the mold 7 by means of a lever 17, connected with the stem 18 of plunger 8 by suitable links 19 and any convenient intervening cushioning device, as a spring 20. Lever 17 is pivoted at 21 on the upwardly-extending standard 22, which also provides a bearing for the plunger-rod, the lever extending backwardly and engaging by a terminal roller with the groove 23 of a cam 24, mounted on the upper end of a vertical shaft 25 and driven through gearing 26 on main shaft 15, as clearly shown in Fig. 1.

The exterior portions of the insulator are entirely formed by molds 6 and 7 and plunger 8, and for the purpose of providing the internally-threaded cavity of the insulator I provide a vertically-reciprocating plunger 27, having a threaded terminal 28, the lower portion of the plunger being provided with annularly-arranged screw ratchet-teeth 29. These teeth of the plunger are engaged by a ratchet-arm 30, pivoted at 31 and provided with one or more teeth 32, which engage the spiral ratchet-teeth 29 and prevent downward travel of the plunger except when reversed, as hereinafter described. The plunger, as shown, has a bearing in the center of mold 6 and passes downwardly through a depending bracket 33, to which the ratchet-arm is pivoted, as clearly shown. The plunger 27 at the proper time is freely raised by means of an independent spindle 34, which in turn is raised by a wiping-cam 35, mounted or secured upon a disk 36 at the outer end of shaft 15. This wiper-cam 35 is so arranged that it will gradually raise the lifting-stem 34, which abuts against the lower end of plunger 27, raising it to the desired height, the wiper-cam 35 then quickly releasing the stem by riding beyond the bearing-roller 37, secured to the stem, allowing it to suddenly drop, as clearly shown in Fig. 5. In such raised position the glass is formed around the threaded end of the plunger, resulting in the finished insulator. For the purpose of removing the threaded plunger it is provided with a star or toothed wheel 38, which engages a series of stationary pins or rack-abutments 39 immediately upon further rotation of the table, causing the spindle to be rotated and to travel in a downward direction during such rotation by reason of the engagement of the threaded terminal 28 with the insulator still in the mold and the spirally-formed ratchet-teeth 29 in engagement with the pivoted ratchet-teeth 32. This operation continues until the threaded terminal has been entirely withdrawn, when the insulator is removed by opening the mold in the usual manner.

The operation will be readily understood from the foregoing description, and while the machine is particularly adapted to the manufacture of insulators it is obvious that other devices may be made of a similar nature, or it may be adapted to other forms wherein it is desirable to form a threaded cavity.

Changes and variations may be made in its design, construction, or proportions by the skilled mechanic, and all such are to be considered as within the scope of the following claims.

What I claim is—

1. Apparatus for forming articles of glassware consisting of a rotatable mold-carrier provided with a circularly-arranged series of molds, a pressing-plunger arranged to coöperate with said molds in rotation, and a series of oppositely-disposed threaded plungers mounted in the mold-carrier, with an independent plunger-raising spindle and means for unscrewing the threaded plungers operated by rotation of the mold-carrier, substantially as set forth.

2. Apparatus for forming articles of glassware consisting of a rotatable mold-carrier provided with a circularly-arranged series of molds, a pressing-plunger arranged to coöperate with said molds in rotation, and a series of oppositely-disposed threaded plungers mounted in the mold-carrier, with means for unscrewing the threaded plungers operated by rotation of the mold-carrier, means for moving the pressing-plunger vertically, and an independent plunger-raising spindle, substantially as set forth.

3. Apparatus for forming articles of glassware consisting of a rotatable mold-carrier provided with a circularly-arranged series of molds, a pressing-plunger arranged to coöperate with said molds in rotation, and a series of oppositely-disposed threaded plungers mounted in the mold-carrier, with means for unscrewing the threaded plungers operated by rotation of the mold-carrier, means for moving the pressing-plunger vertically, an independent plunger-raising spindle, and means for intermittently rotating the mold-carrier, substantially as set forth.

4. The combination with an upper vertically-operating pressing-plunger and a rotatably-traveling mold: of a lower plunger incorporated with the mold having a threaded terminal and provided with an unscrewing device, means adapted to engage said device and become operative upon rotatory travel of the mold, and an independent relatively stationary plunger-raising spindle adapted to abut underneath the plunger, substantially as set forth.

5. The combination with a rotatably-traveling mold, of a traveling vertically-movable spindle provided with a threaded terminal having spiral ratchet-teeth, an arresting-pawl, an independent raising-spindle, and means for unscrewing the threaded terminal of the first spindle from the molded article, substantially as set forth.

6. The combination with a non-traveling pressing-plunger and a rotatably-traveling mold, of a traveling vertically-movable spindle provided with a threaded terminal and having spiral ratchet-teeth, an arresting-pawl, an independent raising-spindle, and means for unscrewing the threaded terminal of the first spindle from the molded article, substantially as set forth.

7. In apparatus for forming articles of glassware, the combination of a rotatable mold-carrier, a series of molds mounted thereon, a pressing-plunger, a series of rotatable threaded plungers mounted on the mold-carrier, an independent raising-spindle therefor, and means for rotating the threaded plungers to unscrew from the molded article, operated by rotation of the mold-carrier, substantially as set forth.

8. In apparatus for forming articles of glassware, the combination of a rotatable mold-carrier, a series of molds mounted thereon, a pressing-plunger, a series of rotatable threaded plungers mounted on the mold-carrier provided with toothed wheels, an independent raising-spindle for the threaded plungers, and a series of stationary rack-abutments adapted to engage the wheel of the threaded plungers to unscrew them from the molded articles, substantially as set forth.

9. In apparatus for forming articles of glassware, the combination of a foundation-frame, a rotatable mold-carrier mounted thereon provided with a series of molds, a vertically-movable pressing-plunger and actuating means therefor mounted on the frame, a vertically-movable threaded plunger mounted in the mold-carrier and projecting upwardly into the mold-cavity, an independent raising-spindle for the threaded plunger and actuating means therefor mounted in the frame, and means for unscrewing the threaded plunger dependent upon movement of the mold-carrier, substantially as set forth.

10. In apparatus for forming articles of glassware, the combination of a foundation-frame, a rotatable mold-carrier mounted thereon provided with a series of molds, a vertically-movable pressing-plunger and actuating means therefor mounted on the frame, a vertically-movable threaded plunger mounted in the mold-carrier and projecting upwardly into the mold-cavity, an independent raising-spindle for the threaded plunger and actuating means therefor mounted in the frame, and means for unscrewing the threaded plunger dependent upon movement of the mold-carrier, with means for intermittently partially rotating the mold-carrier, substantially as set forth.

11. In apparatus for forming articles of glassware, the combination of a stationary frame, a rotatable mold-carrier mounted thereon provided with a series of molds, a pressing-plunger and actuating means therefor mounted on the frame, a series of vertically-movable rotating threaded plungers mounted in the mold-carrier and provided with toothed wheels, an independent raising-spindle and actuating means therefor mounted in the frame, and a series of stationary rack-abutments adapted to engage the toothed wheels of the plunger upon movement of the mold-carrier to withdraw the plungers, substantially as set forth.

12. The combination with a rotatable mold-carrier and a mold thereon, of a vertically-movable threaded plunger projecting into the mold-cavity and provided with annularly-arranged screw ratchet-teeth and a toothed actuating-wheel, a dependent bracket, a pivoted pawl, an independent raising-spindle, and a series of rack-abutments adapted to engage the toothed wheel, with means for imparting motion to said parts, substantially as set forth.

In testimony whereof I affix my signature in presence of two witnesses.

JOHN H. CROSKEY.

Witnesses:
R. H. McLARN,
C. M. CLARKE.